United States Patent Office 3,264,184
Patented August 2, 1966

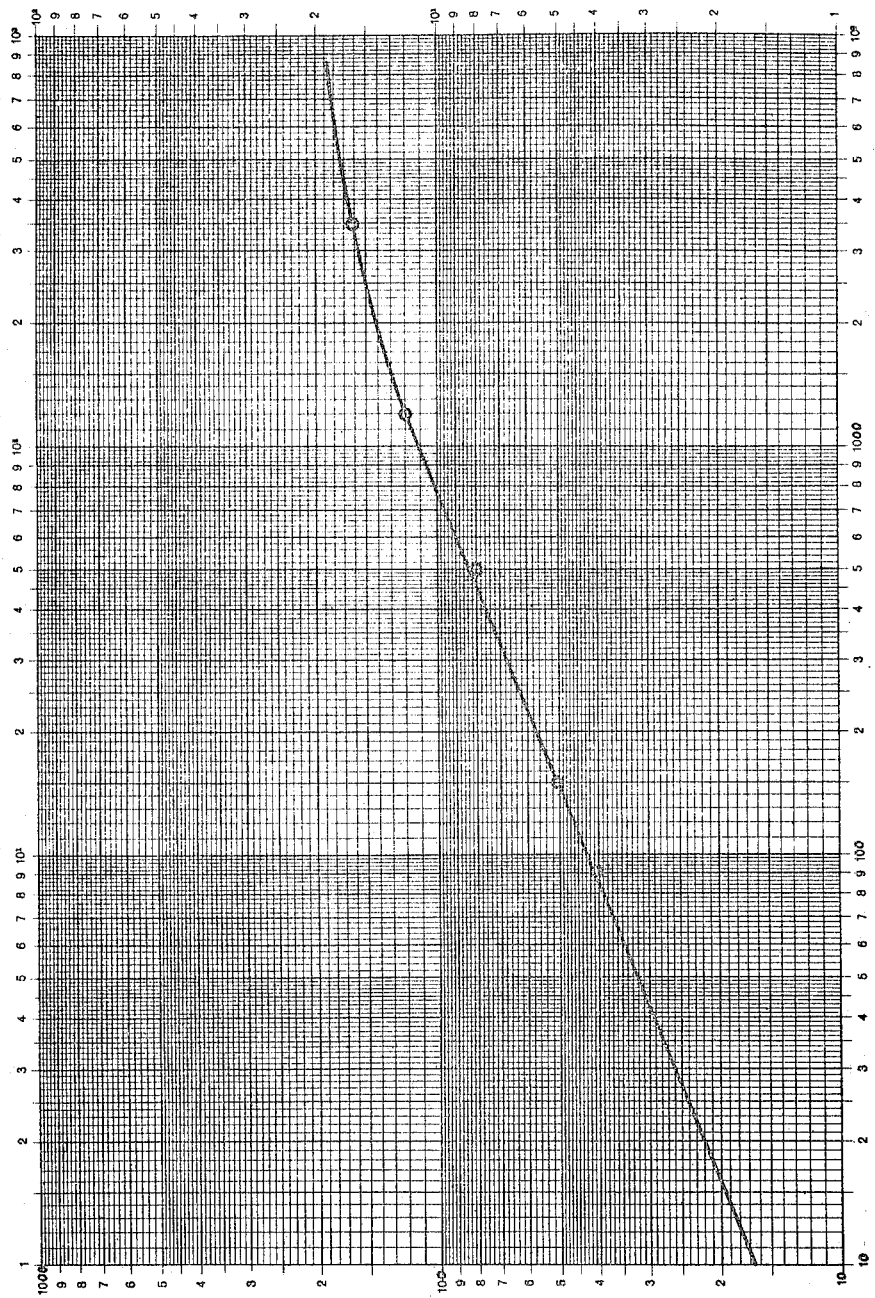

3,264,184
REDUCING THE TOXICITY OF AND EXTENDING THE ACTIVE PERIOD OF ORGANIC PHOSPHOROUS COMPOUNDS
Max Geiger, Riehen, Friedrich Kradolfer and Ladislaus Pinter, Basel, Robert Wyler, Sankt Gallen, and Ernst Beriger, Allschwil, Switzerland, assignors to Ciba Limited, Basel, Switzerland, a Swiss company
Filed June 21, 1963, Ser. No. 289,491
Claims priority, application Switzerland, June 25, 1962, 7,624/62; Feb. 12, 1963, 1,725/63
9 Claims. (Cl. 167—53)

The present invention relates to a process for reducing the toxicity towards warm-blooded animals and for extending the efficiency of biocidal organic phosphorus compounds.

The reduction of the toxicity towards warm-blooded animals, and the extension of the period of activity of biocidal organic phosphorus compounds, more especially of volatile and/or water-soluble representatives of this class, is a problem of considerable practical importance. The present invention is based on the observation that the reduction of the toxicity and the extension of the active period, can be very successfully achieved by adding adsorbent carbon or active carbon.

Accordingly, the present invention provides a process for reducing the toxicity towards warm-blooded animals and/or for extending the active period of volatile and/or water-soluble biocidal, organic phosphorus compounds, wherein these compounds in solid or liquid form are mixed with an adsorbent carbon, preferably active carbon, and, if desired, with further vehicles and/or stabilizers, for example antioxidants.

The present invention is primarily concerned with a process for reducing the toxicity towards warm-blooded animals and/or for extending the active period of dimethyl-dichlorovinyl phosphate or of derivatives thereof, more especially its homologues, wherein the said esters are mixed with adsorbent carbon, preferably active carbon, and, if desired, further vehicles and/or antioxidants.

The term "volatile biocidal organic phosphorus compounds" is used herein to include all compounds of the class mentioned, that have as individual substances a vapour pressure sufficient to give off—possibly a minimum —of the substance concerned to the surroundings, for example at 25° C. under a pressure of 0.001 to 1.0 mm. Hg.

As examples of the afore-mentioned volatile compounds, there may be mentioned those which contain the grouping

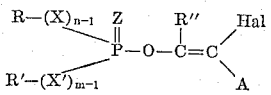

where R and R' each represents an alkyl radical which contains 1 to 5 carbon atoms and which may be substituted by chlorine atoms and may be interrupted by an oxygen atom, or represents a phenyl radical which may be substituted by chlorine atoms; R" represents a hydrogen atom or a methyl group, X, X' and Z each represents an oxygen or sulfur atom, A represents a halogen atom, preferably a chlorine or bromine atom, or a lower alkyl or chloralkyl group, Hal represents a halogen atom, preferably a chlorine or a bromine atom, and $n$ and $m$ each is 1 or 2. There may be mentioned especially dimethyldichlorovinyl phosphate (DDVP) diethyldichlorovinyl phosphate, diisopropyldichlorovinyl phosphate, di-n-propyldichlorovinyl phosphate, di-n-butyldichlorovinyl phosphate, di-isobutyl-dichlorovinyl phosphate, di-secondary butyldichlorovinyl phosphate, bis-(β-chloroethyl)-dichlorovinyl phosphate, the compounds of the formulae

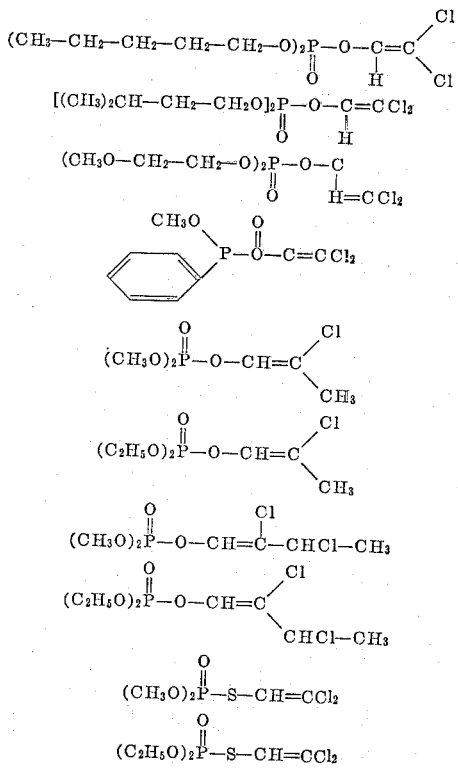

furthermore dimethyldibromo and diethyldibromo vinyl phosphate, methyl-ethyl-dichlorovinyl phosphate, and those esters which can be derived from the above general formula by saturating the double bond with halogen atoms, for example the bromination and chlorination products of DDVP, dimethyl - 1:2-dibromo - 2:2-dichlorethyl phosphate and dimethyl-1:2:2:2-tetrachlorethyl phosphate.

The term "water-soluble biocidal organic phosphorus compounds" is used herein to include, for example, all those compounds of the class defined which display as individual substances a solubility in water of more than 100 parts per million (1 part by weight of substance soluble in 10,000 parts by weight of water.).

As water-soluble compounds of the kind referred to, that are especially suitable for use as active principles in the present process, there may be mentioned, for example, those of the general formula

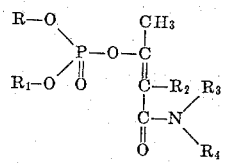

where R, $R_1$, $R_3$ and $R_4$ each represents a lower alkyl radical and $R_2$ represents a methyl group, a hydrogen atom of a chlorine atom.

For this purpose there are particularly suitable those of the above general formula which correspond to the formula

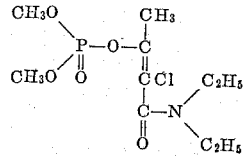

or to the formula

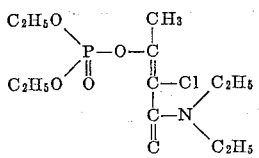

As further compounds suitable for use as active principles in the present process, there may be mentioned those of the general formula

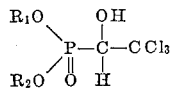

where $R_1$ and $R_2$ each represents an alkyl or alkenyl group, preferably containing up to 5 carbon atoms, which may be interrupted by an oxygen atom, for example the following compounds

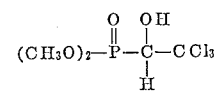

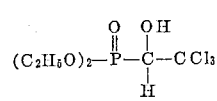

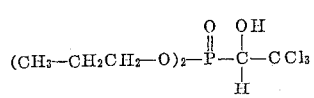

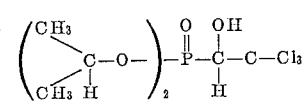

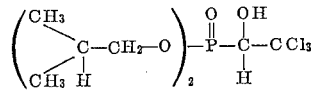

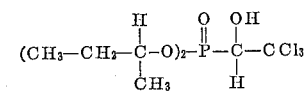

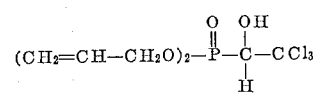

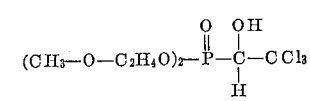

The terms "adsorbent carbon" and "active carbon" are used herein to mean any substance that has a high content of carbon and is capable of combining with substances of a different kind by adsorption and/or capillary condensation and then giving off again at least part of these substances.

These carbons include, for example, charcoal, bone-black, blood charcoal, adsorbent types of peat charcoal or of coke, more especially of brown coal coke; also adsorbent types of coal which are obtained from waste products in the manufacture of paper or cellulose, for example from lignin. Furthermore, there may be mentioned adsorbent carbons or active carbons obtained by a chemical treatment of sawdust, peat or the skin of fruits, for example by treating these materials with phosphoric acids, $K_2S$, KSCN, $KHSO_4$, $MgCl_2$, $CaCl_2$, $ZnCl_2$, $H_2SO_4$ or sulfur vapour.

There may also be used, so-called medicinal carbons, for example based on wood, also the so-called clarifying, water-purifying or gasmask carbons.

The carbon selected may be used in a shaped or unshaped form, and the particle or grain sizes may vary within relatively wide limits. There are suitable, for example, those adsorbent carbons or active carbons which have been described in Ullmann, Technische Enzyklopaedie, volume 9, 1957, pages 800–812, and in Kirk-Othmer, Encyclopaedia of Chemical Technology, volume 2, pages 881–915 (1948). In general the carbon used in the process of the invention should have a neutral to weakly acidic reaction.

In the following, an example is described showing the effect of the addition, according to the invention, of active carbon of a specific quality ("Carboraffin C"; registered trademark) to DDVP by way of the adsorption isotherm of DDVP on this active carbon at room temperature towards water (cf. the figure which shows the aforementioned adsorption isotherm at room temperature (20° C.) (ordinate: mg. of DDVP adsorbed per g. of carbon; abscissa: equilibrium concentration [$\gamma$ of DDVP per liter of solution]).

1 g. of carbon charged with 2% by weight of DDVP was in equilibrium with an aqueous solution of 0.016 mg. of DDVP per liter of water. When the carbon was charged with 5% of DDVP, this corresponded to 0.15 mg. of DDVP per liter of water, for a 9% charge to 0.6 mg. per liter of water and for an 11% charge to 1.00 mg. of DDVP per liter of water.

As has been described above, an addition of 1 g. of carbon charged with 5% by weight of DDVP (=50 mg. of DDVP) to 1 liter of water produces a concentration of 0.15 mg. of free DDVP per liter of water. Thus, 1 liter of aqueous medium liberates from the carbon only 0.15 mg., that is to say 0.3% of the total of DDVP used. When these results are referred to mixtures of DDVP/active carbon present in the digestive tract of warm-blooded animals (taking into account the chemical composition of the stomach and intestinal juices which differs from that of a purely aqueous solution) it will be realized that when a mixture of DDVP, and active carbon is ingested in the digestive tract of warm-blooded animals, the risk of intoxication is reduced to a degree that had hitherto been quite impossible, or is largely obviated. A similar result is obtained when the afore-mentioned active principles, more especially the said DDVP homologues, are used.

When, for example, free DDVP is consumed, for example by hydrolysis, the replenishment by a carbon plus DDVP adsorbate restores the level of free DDVP of 0.15 mg./liter of aqueous medium. Similar conditions occur in the case of the afore-mentioned active principles, more especially in the case of the said DDVP homologues. In this manner, the preparations are provided with a prolonged activity the duration of which in an aqueous medium is limited only by the rate of decomposition of the active principle in water and on the carbon. By giving the carbon a higher charge, or by selecting a less adsorbent type of carbon, the concentration of the active principle in the surrounding medium can be varied within wide limits, according to the desired parasiticidal concentration and to the amount of active principle tolerated by the warm-blooded animal treated. The use of the afore-mentioned adsorbent carbons or active carbons according to the invention may also result in removing the said active principles from aqueous solutions thereof. The adsorption equilibrium can be attained from both sides, that is to say the carbon charged with active principle gives off active principle to the water, or the carbon takes up the active principle from the aqueous solution of the latter, depending on the prevailing conditions.

The system carbon/DDVP/air produces a similar adsorption isotherm, for example, the adsorbed DDVP is in equilibrium with a specific DDVP concentration of a specific volume of air. When the DDVP concentration of this air is reduced by hydrolysis, a change of air or the like, the adsorbate furnishes fresh active principle until the state of equilibrium has been restored. This prevents too high a concentration (which might have a toxic effect) building up in the air. When one of the other active principles mentioned above, especially a DDVP homologue, is used, similar conditions prevail.

The present process may be carried out by simply mixing the components.

Depending on the effect required and on the type of active principle concerned, it may be advantageous to prepare the mixture of carbon and DDVP immediately before its use, either by simply mixing the components or by mixing the carbon with a pulverulent concentrate of the active principle, for example DDVP, on an adsorbent, inert, pulverulent vehicle.

The present invention further includes preparations for combating pests, containing a mixture of (a) a volatile and/or water-soluble biocidal organic phosphorus compound, with (b) an adsorbent carbon or active carbon, and, if desired, at least one of the following further additives:

Natural resins or chemical conversion products thereof, preferably colophony, finely dispersed silicon dioxide or silicate; a carbohydrate ingestible by the pests or a mixture containing a carbohydrate and/or proteins, antioxidants, dispersing, emulsifying, wetting agents, thickening agents, fillers and/or adhesives.

As antioxidants, there may be mentioned the usual aliphatic and aromatic oxidation inhibitors, for example 1:2-propyleneglycol, 2:6-di-tertiary butylphenol, butylhydroxyanisole, bis-(3:5-di-tertiary butyl-4-hydroxyphenyl) methane, 3:5-di-tertiary butyl-4-hydroxybenzyl alcohol, 3:5-diisopropyl-4-hydroxybenzyl alcohol; or simpler phenolic compounds, for example hydroquinone, resorcinol or pyrogallol.

The preparations of the invention may be used for general pest control, in plant protection and in hygiene, for example for combating harmful insects, acarides, nematodes and snails.

They combat insects and acarides in their diverse stages of development, for example eggs, larvae and imagines, by acting both as contact and stomach poisons.

A wide variety of objects may be protected from the pests concerned, and the vehicle for the active principle may be liquid or solid. Examples of bodies to be protected or used as vehicle include: Liquids, for example water in ponds, and any other dead or living solid support, for example any articles in inhabited rooms, in cellars, in lofts or in stables, and plants and animals in their diverse stages of development, provided they are not damaged by the pesticides.

As emulsifying or dispersing agent, forming another constituent of the new preparations, there are suitable non-ionic products, for example condensation products from aliphatic alcohols, amines or carboxylic acids having a long-chain hydrocarbon radical of about 10 to 30 carbon atoms, with ethylene oxide, for example the condensation product of octadecyl alcohol with 25–30 molecular proportions of ethylene oxide, or of commercial oleylamine with 15 mols of ethylene oxide, or of dodecylmercaptan with 12 mols of ethylene oxide. Examples of suitable anionic emulsifying agents include: The sodium salt of the dodecyl alcohol sulfuric acid ester, the sodium salt of dodecylbenzenesulfonic acid, the potassium salt or triethanolamine salt of oleic acid or of abietic acid or of mixtures of these two acids, or the sodium salt of a petroleum-sulfonic acid. Suitable cationic dispersing agents are quaternary ammonium compounds, for example cetyl pyridinium bromide, dihydroxyethylbenzyl dodecyl ammonium bromide or dihydroxyethylbenzyl dodecyl ammonium chloride.

When manufacturing the new preparations in the form of sprinkling or dusting agents there may be used as solid vehicles, talcum, kaolin, bentonite, cork meal, wood meal and other materials of vegetable origin. It is also very advantageous to manufacture the new preparations in the form of granulates. The new preparations for general pest control may also contain the conventional substances capable of improving the distribution, the adhesion, the stability towards rain or the penetration. As such substances there may be mentioned: fatty acids, resins, glue, casein or, for example, alginates.

As examples of uses of the new preparations in plant protection there may be mentioned the treatment of plant seeds and of wholly or only partially grown plants, and the treatment of the soil in which the said plants grow, for protection from harmful organisms, for example from harmful nematodes, acarides and insects. In this connection, the absence of phytotoxic side effects when the new preparations are used in efficient concentrations is especially advantageous.

The proportions in which the constituents of the new preparations can be used may vary within relatively wide limits, depending on the saturation concentration of the individual active principle on the adsorbent. The adsorbed amount of active principle may vary from, for example, 1 to 30%, preferably from 1 to 20%, calculated on the total weight of the adsorbate.

The preparations of the present invention can be used for combating flies or gnats or their larvae, for example aedes larvae, wherein a mixture of (a) one of the aforementioned organic phosphorus compounds, with (b) an adsorbent carbon, preferably active carbon, and, if desired, colophony and/or finely dispersed silicon dioxide is used and preferably applied to the surface of water in the open, infested by the pests to be controlled. In this application particularly favorable results are achieved by using as constituent (a) either DDVP or a compound of one of the formulae

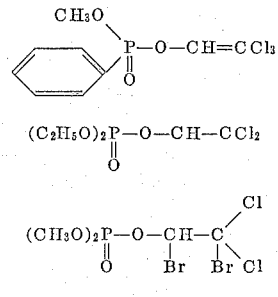

It is a special advantage of the new preparations that, when used for the control of pests, for example aedes larvae, they do not render the water toxic for fish.

The preparations of the invention may also be used for combating parasites, more especially as anthelmintics, in veterinary medicine, more especially for the therapy of intestinal worms, for example nematodes infesting mucosae or lumens.

For this purpose preparations that have a particularly favorable effect, or display a particularly useful ratio of antiparasitic effect to toxicity towards warm-blooded animals are those which contain as constituent (a) one of the following compounds

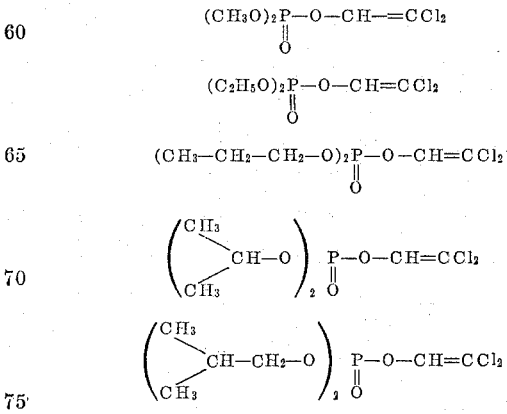

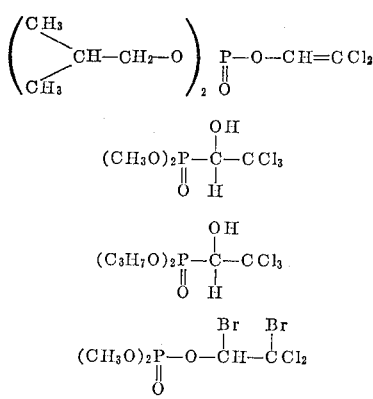

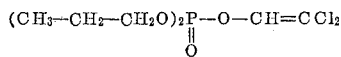

An anthelmintic effect can be produced, for example, towards the following species in their diverse stages of development: *Trichostrongylidae* (more especially their larvae), *cyclophyllidae* and *oxyurids*. Thus, as mentioned above, the new preparations are suitable for combating endoparasites in warm-blooded animals, for example intestinal worms in cattle, sheep, goats, horses, pigs, cats, dogs, fur-bearing animals, rabbits, and all kinds of fowls. Thus, for example, the following species can be successfully controlled: *Nematodirus, Ostertagia, cooperia, trichostrongylus, haemonchus, trichuris, capillaria* and *anoplocephala* species in the horse. For the purposes referred to above, the new preparations may be used in the form of the conventional preparations, for example as suspensions, dispersions, powders or syrups, and advantageously in the form of capsules, for example gelatine capsules, and also in the form of tablets, dragees or the like. It may be advantageous to use preparations that release the active principle only after they have travelled through the stomach and/or the upper portions of the digestive tract of the animal being treated. When the preparations are used in the form of gelatine capsules, this may be achieved, for example, by using a suitably prepared gelatine or by making the wall of the capsule of an appropriate thickness, or when the preparation is in the form of a tablet or dragee, by suitable preparation or thickness of the coatings covering the core. Particularly efficacious for combating endoparasites in warm-blooded animals are those preparations of the invention which contain as active principle one of the aforementioned DDVP homologues. These preparations possess the advantage that it is possible to use an especially high content, for example 30%, of active principle in the adsorbate without causing toxicity towards the warm-blooded animals.

The new preparations may also be used in the form of dispersions in potable water or skimmed milk, or other suspending agents capable of triggering off the esophageal tube reflex in ruminants. The present invention further includes animal fodders and additives to animal fodders, containing a mixture of (a) a volatile and/or water-soluble biocidal organic phosphorus compound of the kind defined above and (b) an adsorbent carbon or active carbon.

The new veterinary-medicinal preparations respectively contain, for example 5 to 30%, preferably 5 to 20%, of active principle adsorbed on carbon. The dosage depends on the case to be treated, and on the kind of animal to be treated and the degree to which it is infested with worms. In general, the dose will be 1 to 50 mg., preferably 5 to 40 mg., per kg. of body weight. Thus, a preferably administered dose of active principle in the form of an adsorbate of 10% strength of DDVP on active carbon is 25 to 50 mg./kg., when an adsorbate of 10% strength of the compound $$(CH_3-CH_2-CH_2O)_2P(=O)-O-CH=CCl_2$$

is used it is 5 to 10 mg./kg., and when an adsorbate of 30% strength of the compound of the formula $$(iso-C_4H_9O)_2P(=O)-O-CH=CCl_2$$

on active carbon is used it is 25 to 30 mg./per kg. of body weight. Adsorbates having a higher concentration of active principle tend to develop their full activity in the upper portions of the digestive tract, whereas adsorbates having a lower content of active principle do not develop their full activity until they reach the lower portions of the digestive tract.

The following examples illustrate the invention, the percentages being percentages by weight:

*Example 1*

A preparation for peroral administration was manufactured by charging gelatine capsules each with 500 mg. of a 10% adsorbate of DDVP or of the compound of the formula $$(CH_3-CH_2-CH_2O)_2P(=O)-O-CH=CCl_2$$

or of the formula $$(iso-C_4H_9O)_2P(=O)-O-CH=CCl_2$$

on active carbon.

If desired, DDVP may be replaced by any one of the other active principles referred to above.

*Example 2*

(a) 2 g. of DDVP were mixed with 98 g. of active carbon (which, if desired, has been dried at 100° C. under vacuum until its weight remained constant).

(b) 30 g. of diisobutyl-dichlorovinyl phosphate (or any one of the above-mentioned organic phosphorus compounds) were mixed with 70 g. of active carbon.

The resulting pesticides may be used in pest control and in hygiene.

*Example 3*

In each test, 24 mg. of a finely ground adsorbate on active carbon containing 1% of the under-mentioned active principles were sprinkled into 4 liters of distilled water contained in a vessel of 20 cm. depth, in which there were present about 50 larvae of *Aedes aegypti*:

(A) DDVP (B) 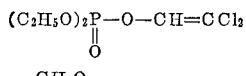

(C) 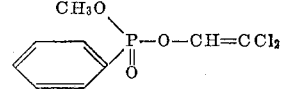

(D) 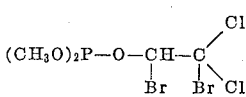

Part of the pulverulent bait settled on the bottom, while the remainder remained on the surface. Observation revealed that the larvae could eat in shallow water both the bait on the bottom and the bait floating on the surface. The test was carried out as follows: Over a sufficiently long period, the effect achieved was measured every 24 and 48 hours respectively, and when the result was positive, fresh larvae were added to the water. For comparison, a test was performed under identical conditions, using the same amount of active principle, but without the active carbon vehicle. The result obtained are summarized in the following

TABLE

| Carbon adsorbate of the active principle | Effective towards Aedes larvae, in days | Comparison (active principle without carbon vehicle) effective towards Aedes larvae, in days |
|---|---|---|
| A | 33 | 4–6 |
| B | 61→ | 6 |
| C | 40 | 2–3 |
| D | 29 | 1 |

→Signifies that the medium tested continued to be effective when the test was discontinued.

What is claimed is:

1. A preparation for combating insects, acarides and nematodes which comprises a pesticidal amount of a mixture of (a) a compound of the formula

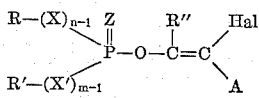

wherein R and R' each represents a member selected from the group consisting of alkyl containing at most 5 carbon atoms, and phenyl, R" represents a member selected from the group consisting of hydrogen and methyl, X, X', and Z each represents a member selected from the group consisting of oxygen and sulfur, A represents a member selected from the group consisting of chlorine, bromine, lower alkyl and lower chloroalkyl, and Hal represents a member selected from the group consisting of chlorine and bromine, and n and m each represents as integer of at most 2, with (b) active carbon.

2. A preparation as claimed in claim 1 which comprises as component (a) the compound of the formula

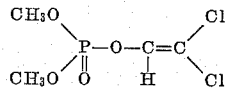

3. A preparation as claimed in claim 1 which comprises as component (a) the compound of the formula

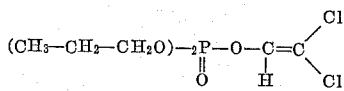

4. A preparation as claimed in claim 1 which comprises as component (a) the compound of the formula

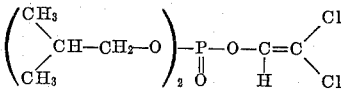

5. A preparation as claimed in claim 1 which comprises as component (a) the compound of the formula

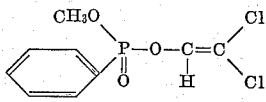

6. A preparation for combating insects, acarides and nematodes which comprises a pesticidal amount of a mixture of (a) the compound of the formula

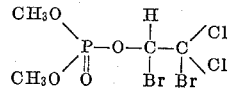

with (b) active carbon.

7. A preparation as claimed in claim 1, wherein the component (a) is present in an amount of 1 to 30 percent calculated on the total weight of the mixture of (a) with (b).

8. The method for combating intestinal worms living as parasites in warm-blooded animals which comprises administering orally to the animal to be treated a parasiticidal amount of a mixture of (a) a compound of the formula

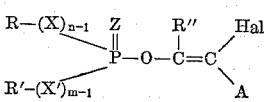

wherein R and R' each represents a member selected from the group consisting of alkyl containing at most 5 carbon atoms, and phenyl, R" represents a member selected from the group consisting of hydrogen and methyl, X, X' and Z each represents a member selected from the group consisting of oxygen and sulfur, A represents a member selected from the group consisting of chlorine, bromine, lower alkyl and lower chloroalkyl, and Hal represents a member selected from the group consisting of chlorine and bromine, and n and m each represents an integer of at most 2, with (b) active carbon.

9. The method for combating intestinal worms living as parasites in warm-blooded animals which comprises administering orally to the animal to be treated 1 to 50 mgs. per kg. of body weight of a mixture of (a) the compound of the formula

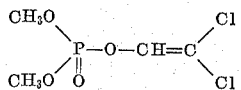

with (b) active carbon, wherein the component (a) is present in an amount of 5 to 30% calculated on the total weight of the mixture of (a) with (b).

References Cited by the Examiner
UNITED STATES PATENTS 1,807,078  5/1931  Walker _____ 167—42
3,166,472  1/1965  Menn _____ 167—53

OTHER REFERENCES

Radeleff: J. Am. Vet. Med. Ass'n, vol. 136, No. 11, June 1, 1960, pages 529 to 537.

Tarshis: Experimental Parsitology, vol. 11, 1961, pages 10, 11 and 16.

JULIAN S. LEVITT, *Primary Examiner.*

FRANK CACCIAPAGLIA, JR., *Examiner.*

SAM ROSEN, *Assistant Examiner.*